United States Patent
Melancon et al.

(10) Patent No.: US 6,889,948 B2
(45) Date of Patent: May 10, 2005

(54) FLANGE FOR CONNECTING FAN TO MANWAY

(76) Inventors: Malcom R. Melancon, 13776 Bayou Ter., St. Amant, LA (US) 70774; Sedgie F. Melancon, 13803 Bayou Ter., St. Amant, LA (US) 70774

( * ) Notice: Subject to any disclaimer, the term of this patent is extended or adjusted under 35 U.S.C. 154(b) by 0 days.

(21) Appl. No.: 10/016,053

(22) Filed: Dec. 6, 2001

(65) Prior Publication Data

US 2003/0106975 A1 Jun. 12, 2003

(51) Int. Cl.$^7$ ................................................ A47F 5/00
(52) U.S. Cl. ..................................................... 248/309.1
(58) Field of Search ............................. 248/309.1, 56, 248/343, 344

(56) References Cited

U.S. PATENT DOCUMENTS

| | | | | |
|---|---|---|---|---|
| 3,426,445 A | * | 2/1969 | Steffen | 34/233 |
| 3,610,524 A | | 10/1971 | Wallen | |
| 3,785,271 A | * | 1/1974 | Joy | 454/356 |
| 4,037,527 A | * | 7/1977 | Steffen | 454/182 |
| 4,270,695 A | | 6/1981 | Carson | |
| 4,285,269 A | | 8/1981 | Pelsue et al. | |
| 4,306,490 A | * | 12/1981 | Kallestad et al. | 454/182 |
| 4,441,403 A | * | 4/1984 | Hansen | 454/182 |
| 4,515,071 A | * | 5/1985 | Zach | 454/182 |
| 4,982,653 A | | 1/1991 | Gordon et al. | |
| 5,097,976 A | | 3/1992 | Zink et al. | |
| 5,337,994 A | | 8/1994 | Vipond et al. | |
| 5,386,845 A | | 2/1995 | Zink | |
| 5,836,554 A | * | 11/1998 | Lesage | 248/152 |
| 6,021,543 A | | 2/2000 | Allen | |
| 6,168,514 B1 | | 1/2001 | Weston | |

FOREIGN PATENT DOCUMENTS

| | | |
|---|---|---|
| EP | 0288781 | 11/1988 |
| JP | 2000238695 | 9/2000 |

* cited by examiner

Primary Examiner—Leslie A. Braun
Assistant Examiner—Kofi Schulterbrandt
(74) Attorney, Agent, or Firm—David L. Ray

(57) ABSTRACT

A flange for connecting a fan to a manway which enables the extension of lines from the exterior of the manway through the manway having the fan attached thereto, the flange having a top plate for connecting the flange to the fan, the top plate having a generally circular opening in the center thereof, a bottom plate for connecting the flange to the manway, the bottom plate having a generally circular opening in the center thereof, and a hollow sleeve having a cylindrical wall terminating in two generally circular ends, one of the two ends being connected to the bottom plate at the periphery of the opening in the bottom plate, and the other of the two ends being connected to the top plate at the periphery of the opening in the top plate, the sleeve having at least one opening in the wall for receipt of the lines.

4 Claims, 4 Drawing Sheets

FLANGE FOR CONNECTING FAN TO MANWAY

BACKGROUND OF THE INVENTION

1. Field of the Invention

The present invention relates to ventilating systems for tanks. In particular, the present invention relates to apparatus for attaching exhaust fans to a manway in a tank for exhausting gases from a tank and circulating fresh air therethrough.

2. Description of the Related Art

Exhaust and ventilation fans are used in large tanks and other enclosed areas such as sewers in which workers are welding or performing other tasks such as repairing, painting, cleaning, or the like. Commonly such tanks are cylindrical in shape and have two or more manways to enable workers to enter and exit the tank. Such manways are commonly 20 to 24 inches in diameter. When workers are in the tank, a circular fan well known in the art is attached to one of the manways to exhaust air from the manway and pull air into the tank from the other manway or manways. Such ventilating or exhaust fan is normally connected directly to one manway, thus preventing welding or painting hoses or electrical wires for use by the workers inside the tank from being extended through the manway with the fan attached thereto.

There is thus a need for an apparatus for attaching a fan to a manway in a tank or other enclosed area accessible by a manway which enables a worker to extend hoses and electrical wires through the manway having the fan attached thereto.

Exemplary of the patents of the related art are the following: U.S. Pat. Nos. 3,610,524; 4,270,695; 4,285,269; 4,982,653; 5,097,976; 5,386,845; 6,021,543; and 6,168,514; European Patent EPO288781B1 and Japanese Patent JP200238695.

BRIEF SUMMARY OF THE INVENTION

In accordance with the present invention there is provided a flange for connecting a fan to a manway which enables the extension of lines such as wires and hoses from the exterior of the manway through the manway to the interior of the manway having the fan attached thereto.

The apparatus of the invention includes a flange for connecting a fan to a manway, the flange having a top plate for connecting the flange to the fan, the top plate having a generally circular opening in the center thereof a bottom plate for connecting the flange to the manway, the bottom plate having a generally circular opening in the center thereof and a hollow sleeve having a cylindrical wall terminating in two generally circular ends, one of the two ends being connected to the bottom plate at the periphery of the opening in the bottom plate, and the other of the two ends being connected to the top plate at the periphery of the opening in the top plate, the sleeve having at least one opening in the wall for receipt of the lines.

DETAILED DESCRIPTION OF THE INVENTION

Figure 1:
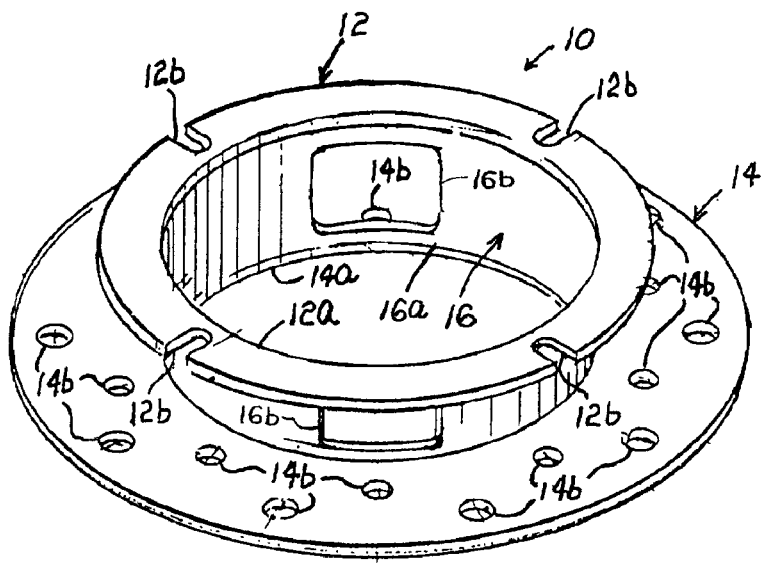
FIG. 1 is a perspective view of the flange of the invention.
Figure 2:
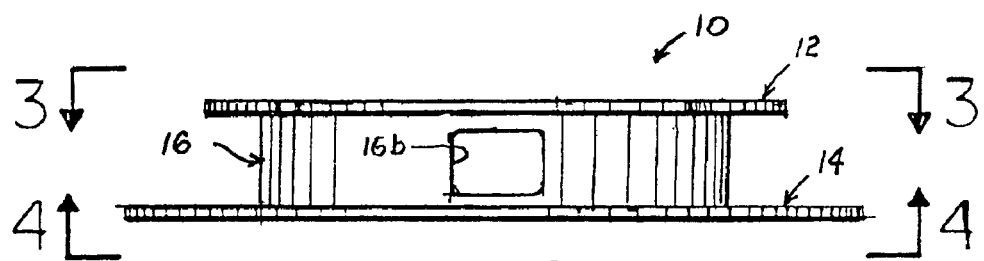
FIG. 2 is a side elevational view of the flange of the invention.
Figure 3:
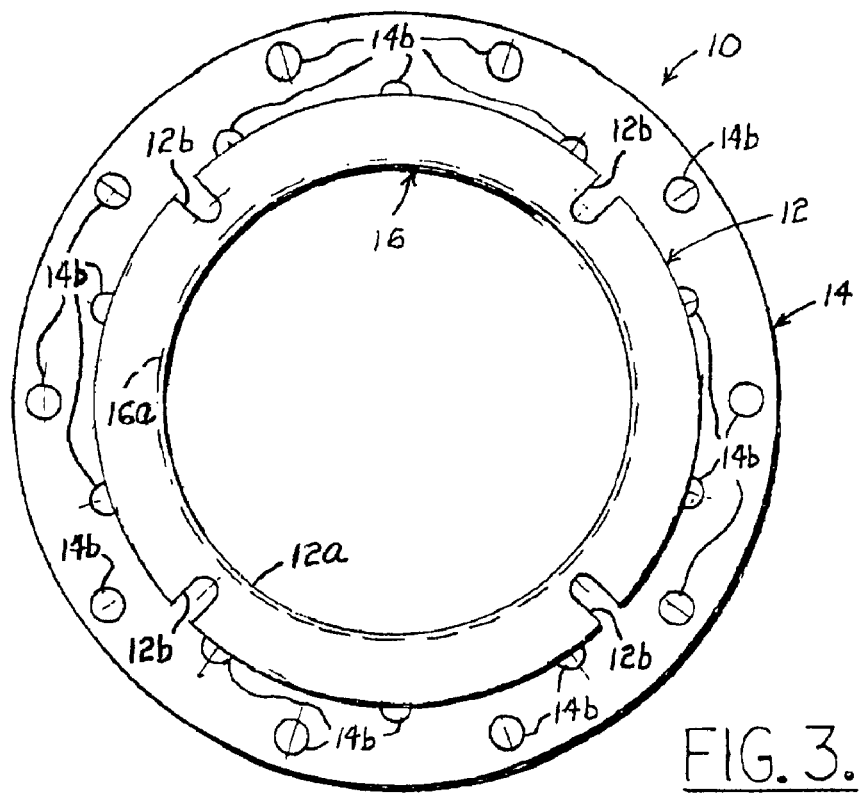
FIG. 3 is a top plan view of the flange of the invention.
Figure 4:
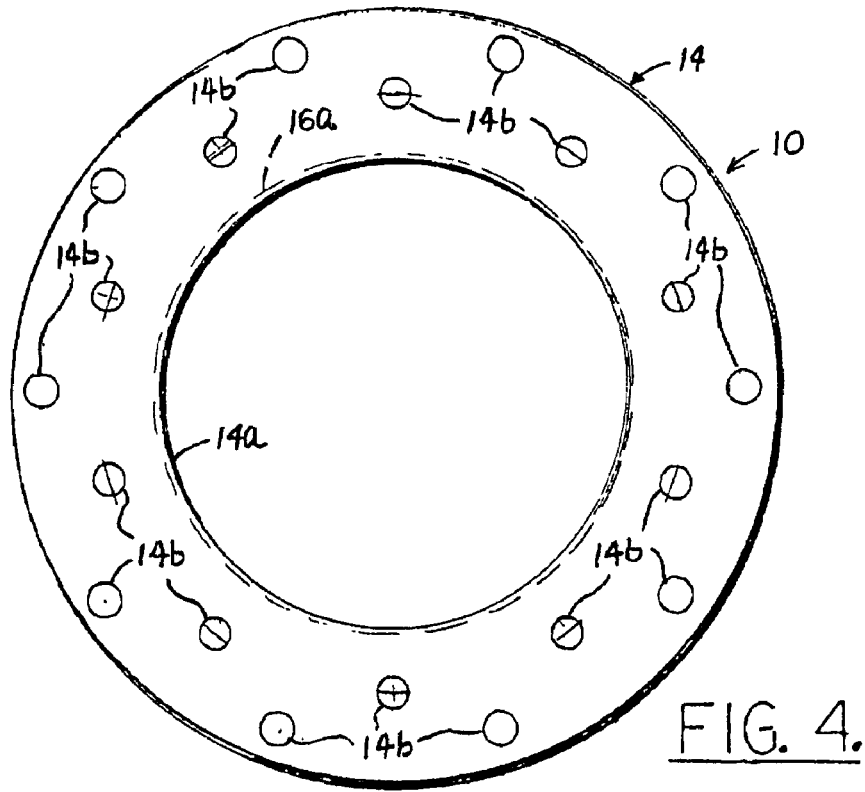
FIG. 4 is a bottom plan view of the flange of the invention.

Referring now to the drawings, and in particular to FIGS. 1–4, the flange of the invention is generally indicated by the numeral 10. Flange 10 has a generally circular top plate generally indicated by the numeral 12 and a generally circular bottom plate generally indicated by the numeral 14. Top plate 12 is rigidly connected to one end of the hollow cylindrical sleeve generally indicated by the numeral 16 by welding or the like, and bottom plate 14 is rigidly connected to the other end of the hollow cylindrical sleeve 16 by welding or the like. Preferably, top plate 12 is parallel to bottom plate 16, and sleeve 16 is perpendicular to top plate 12 and bottom plate 14.

Top plate 12 has a generally circular opening 12a therein with is aligned with the hollow circular opening 16a in sleeve 16. A plurality of slots 12b are equally spaced around the periphery of top plate 12 for receipt of fasteners such as bolts 18 shown in FIG. 5. If desired, slots 12b could be replaced with circular openings similar to openings 14b in bottom plate 14. Bolts 18 and nuts 18a are utilized to connect the fan assembly generally indicated by the numeral 20 to top plate 12.

Fan assembly 20 is well known in the art and includes a bottom circular flange 20a having slots in the periphery thereof connected to a top circular flange 20b by cylindrical housing 20c. Fan 20d is connected to the interior walls of cylindrical housing 20c by a plurality of arms 20e.

Bottom plate 14 has a generally circular opening 14a therein with is aligned with the hollow circular opening 16a in sleeve 16. A plurality of circular fastener openings 14b are spaced around top plate 12 for receipt of fasteners such as bolts 22 shown in FIG. 5. Bolts 22 and nuts 22a are utilized to connect the flange 10 to the conventional flange plate 24a of the manway generally indicated by the numeral 24 in FIGS. 5 and 6 in the tank generally indicated by the numeral 26.

Figure 5:
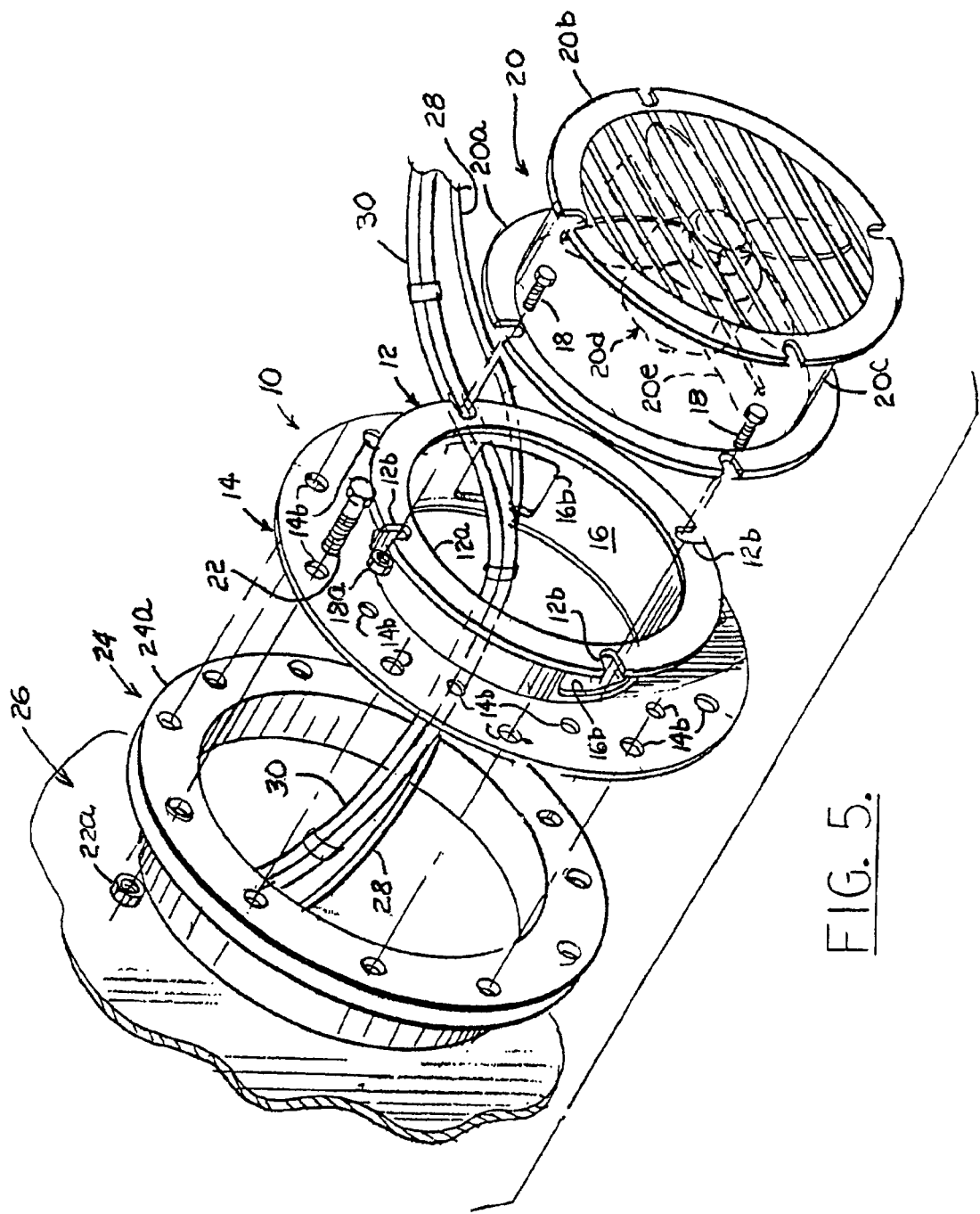
FIG. 5 is an exploded, partly cut-away, perspective view of the flange of the invention aligned between a manway and a fan.
Figure 6:
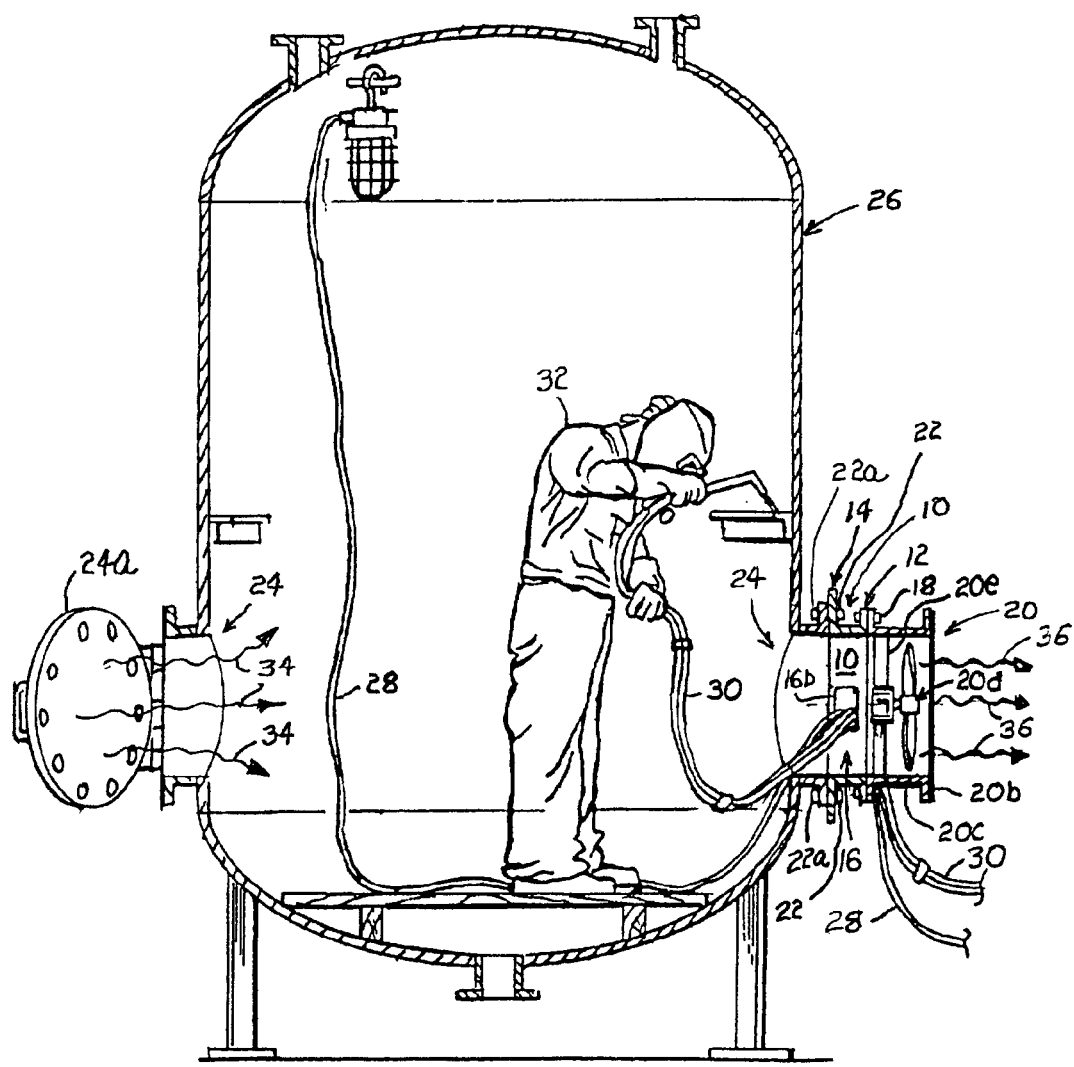
FIG. 6 is a cross-sections, elevational view of a tank having the flange of the invention connected to a manway in the tank and to a fan.

Sleeve 16 has a plurality of generally rectangular openings 16b therein for receipt of lines such as wires 28 and hoses 30 as shown in FIGS. 5 and 6 extending from the exterior of sleeve 16 through the interior of sleeve 16 and through flange 10. Openings 16b may have any other desired shape such as circular or oval and the like. As shown in the drawings, sleeve 16 has two openings 16b. However, if desired, more or one opening 16b could be located in sleeve 16.

As shown in FIG. 6, to utilize the flange 10 of the invention to ventilate a tank 26 in which a worker 32 is working, flange 10 is connected by bolts 22 to one of two manways 25 of tank 26. Wire 28 and hoses 30 are extended through opening 16b of sleeve 16 of flange 10 into the interior 26a of tank 26. Fan assembly 20 is connected to flange 10 by bolts 18 and nuts 18a Worker 32 receives fresh ambient air indicated by the arrows 34 entering through the manway 24 having door 24a, and air in the interior of tank 26 containing gases from welding, painting, breathing or the like exit through fan assembly 20 as indicated by the arrows 36.

Preferably flange 10 is constructed from a rigid material such as steel. However, flange 10 could be constructed from a rigid material such as aluminum, or other metals and alloys of metals. If desired, flange 10 could be constructed from a rigid polymeric material such as thermoplastic and thermosetting polymeric resins such as polyvinyl chloride and the like.

Although the preferred embodiments of the invention have been described in detail above, it should be understood that the invention is in no sense limited thereby, and its scope is to be determined by that of the following claims.

What is claimed is:

1. A portable flange temporarily connecting an exhaust fan to a tank for exhausting gases from the tank and circulating fresh air to a normally closed manway to said tank while workers are temporarily working in said tank which enables the extension of worker's hoses and electrical wires from the exterior of said manway through said manway having said exhaust fan attached thereto into said tank, said flange comprising:

a. a top plate for temporarily connecting said flange to said exhaust fan, said top plate having a generally circular opening in the center thereof, b. a bottom plate for temporarily connecting said flange to said manway, said bottom plate having a generally circular opening in the center thereof, and c. a hollow sleeve having a cylindrical wall terminating in two generally circular ends, one of said two ends being connected to said bottom plate at the periphery of said opening in said bottom plate, and the other of said two ends being connected to said top plate at the periphery of said opening in said top plate, said sleeve having at least one unobstructed opening in said wall between said exhaust fan and said tank for temporary receipt of said hoses and electrical wires extending from the exterior of said manway having said exhaust fan attached thereto into said tank, wherein said top plate is parallel to said bottom plate, and said wall of said sleeve is perpendicular to said bottom plate and said top plate.

2. The flange of claim 1 wherein said top plate has a plurality of openings therein for receipt of a fastener.

3. The flange of claim 2 wherein said bottom plate has a plurality of openings therein for receipt of a fastener.

4. The flange of claim 3 wherein said fastener is a bolt.

* * * * *